United States Patent
Xu et al.

(10) Patent No.: US 11,731,206 B2
(45) Date of Patent: *Aug. 22, 2023

(54) REPAIR OF THROUGH-HOLE DAMAGE USING BRAZE SINTERED PREFORM

(71) Applicant: Rolls-Royce Corporation, Indianapolis, IN (US)

(72) Inventors: Raymond Ruiwen Xu, Indianapolis, IN (US); Scott Nelson, Indianapolis, IN (US); Joseph Peter Henderkott, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,397

(22) Filed: Apr. 15, 2022

(65) Prior Publication Data

US 2022/0241881 A1    Aug. 4, 2022

Related U.S. Application Data

(63) Continuation of application No. 16/272,664, filed on Feb. 11, 2019, now Pat. No. 11,305,363.

(51) Int. Cl.
*B23K 1/00*    (2006.01)
*F01D 5/00*    (2006.01)
(Continued)

(52) U.S. Cl.
CPC ............ *B23K 1/0018* (2013.01); *F01D 5/005* (2013.01); *F01D 25/005* (2013.01); *B23K 1/20* (2013.01);
(Continued)

(58) Field of Classification Search
CPC ............ B23K 35/0244; B23K 35/3046; B23K 1/0018; B23K 35/3033; B23K 35/025; B23K 35/0222
See application file for complete search history.

(56) References Cited

U.S. PATENT DOCUMENTS 3,067,508 A * 12/1962 Kinelski .............. B23K 35/322
                                                        228/199
3,390,986 A    7/1968 Stenerson
(Continued)

FOREIGN PATENT DOCUMENTS

CN    105091030    11/2015
DE    102005059299 A1    6/2006
(Continued)

OTHER PUBLICATIONS

Final Examination Report from counterpart Singapore Application No. 10202001061U dated Aug. 2, 2022, 5 pp.
(Continued)

*Primary Examiner* — Erin B Saad
(74) *Attorney, Agent, or Firm* — Shumaker & Sieffert, P.A.

(57) ABSTRACT

A method may include removing a portion of a base component adjacent to a damaged portion of the base component to define a repair portion of the base component. The base component may include a cobalt- or nickel-based superalloy, and the repair portion of the base component may include a through-hole extending from a first surface of the base component to a second surface of the base component. The method also may include forming a braze sintered preform to substantially reproduce a shape of the through-hole. The braze sintered preform may include a Ni- or Co-based alloy. The method additionally may include placing the braze sintered preform in the through-hole and heating at least the braze sintered preform to cause the braze sintered preform to join to the repair portion of the base component and change a microstructure of the braze sintered preform to a brazed and diffused microstructure.

20 Claims, 10 Drawing Sheets

(51) Int. Cl.
  *F01D 25/00* (2006.01)
  *C23C 4/073* (2016.01)
  *B23K 1/20* (2006.01)
  *B23P 6/00* (2006.01)
(52) U.S. Cl.
  CPC ............. *B23P 6/005* (2013.01); *C23C 4/073* (2016.01); *F05D 2230/237* (2013.01); *F05D 2300/171* (2013.01)

(56) References Cited

U.S. PATENT DOCUMENTS

| | | |
|---|---|---|
| 4,125,344 A | 11/1978 | Tiefenbacher |
| 4,209,348 A | 6/1980 | Duhl et al. |
| 4,325,994 A | 4/1982 | Kitashima et al. |
| 4,396,445 A | 8/1983 | Sasaki et al. |
| 4,611,752 A | 9/1986 | Jahnke |
| 4,614,296 A | 9/1986 | Lesgourgues |
| 4,940,566 A | 7/1990 | Wood et al. |
| 5,017,753 A | 5/1991 | Deckard |
| 5,332,360 A | 7/1994 | Correia et al. |
| 5,381,944 A | 1/1995 | Makowiecki et al. |
| 5,395,584 A | 3/1995 | Berger et al. |
| 5,474,227 A | 12/1995 | Krengel et al. |
| 5,732,468 A | 3/1998 | Galley et al. |
| 5,797,725 A | 8/1998 | Rhodes |
| 5,902,421 A * | 5/1999 | Christy .................. C22C 19/056 420/586 |
| 5,902,498 A | 5/1999 | Mistry et al. |
| 6,003,754 A | 12/1999 | Rhodes |
| 6,172,327 B1 | 1/2001 | Aleshin et al. |
| 6,195,864 B1 | 3/2001 | Chesnes |
| 6,199,746 B1 | 3/2001 | Dupree et al. |
| 6,213,714 B1 | 4/2001 | Rhodes |
| 6,214,248 B1 | 4/2001 | Browning |
| 6,325,871 B1 | 12/2001 | Burke et al. |
| 6,454,885 B1 | 9/2002 | Chesnes et al. |
| 6,464,128 B1 | 10/2002 | Messelling et al. |
| 6,575,702 B2 | 6/2003 | Jackson et al. |
| 6,579,061 B1 | 6/2003 | Heyward et al. |
| 6,797,914 B2 | 9/2004 | Speranza et al. |
| 6,837,417 B2 | 1/2005 | Srinivasan |
| 6,951,112 B2 | 10/2005 | Czachor |
| 7,051,435 B1 | 5/2006 | Subramanian et al. |
| 7,080,971 B2 | 7/2006 | Wilson |
| 7,146,725 B2 | 12/2006 | Kottilingam et al. |
| 7,343,676 B2 | 3/2008 | Ng |
| 7,484,928 B2 | 2/2009 | Amess et al. |
| 7,506,793 B2 | 3/2009 | Sathian |
| 7,653,994 B2 | 2/2010 | Dasilva et al. |
| 7,731,809 B2 | 6/2010 | Hu |
| 7,761,989 B2 | 7/2010 | Lutz et al. |
| 7,845,549 B2 | 12/2010 | Budinger |
| 7,966,707 B2 | 6/2011 | Szela et al. |
| 7,975,902 B2 | 7/2011 | Wilden et al. |
| 8,070,450 B1 | 12/2011 | Ryznic |
| 8,087,565 B2 | 1/2012 | Kottilingam et al. |
| 8,247,733 B2 | 8/2012 | Zhu |
| 8,356,409 B2 | 1/2013 | Perret |
| 8,449,249 B2 | 5/2013 | Suchezky |
| 8,528,208 B2 | 9/2013 | Rebak et al. |
| 8,539,659 B2 | 9/2013 | Szela et al. |
| 8,555,500 B2 | 10/2013 | Vossberg et al. |
| 8,590,158 B2 | 11/2013 | Gallagher et al. |
| 8,685,314 B2 | 4/2014 | Tuppen et al. |
| 8,703,044 B2 | 4/2014 | Sathian et al. |
| 8,739,404 B2 | 6/2014 | Bunker et al. |
| 8,875,392 B2 | 11/2014 | Richter |
| 9,003,657 B2 | 4/2015 | Bunker et al. |
| 9,085,980 B2 | 7/2015 | Mittendorf et al. |
| 9,174,312 B2 | 11/2015 | Baughman et al. |
| 9,228,958 B2 | 1/2016 | Shirkhodaie et al. |
| 9,434,017 B2 * | 9/2016 | Salm .................. B23K 1/19 |
| 9,476,306 B2 | 10/2016 | Bunker |
| 9,624,786 B2 | 4/2017 | Xu et al. |
| 9,751,147 B2 | 9/2017 | Rhodes et al. |
| 9,810,069 B2 | 11/2017 | Dubs et al. |
| 9,863,249 B2 | 1/2018 | Shinn et al. |
| 10,076,811 B2 | 9/2018 | Dzbaysal |
| 10,315,264 B2 * | 6/2019 | Cui ..................... B23K 28/02 |
| 10,478,920 B2 | 11/2019 | Shuck |
| 10,875,128 B2 | 12/2020 | Xu et al. |
| 11,090,771 B2 | 8/2021 | Henderkott et al. |
| 11,305,363 B2 * | 4/2022 | Xu ..................... B23K 1/0018 |
| 2002/0157737 A1 | 10/2002 | Chesnes et al. |
| 2003/0026697 A1 | 2/2003 | Subramanian et al. |
| 2003/0177640 A1 * | 9/2003 | Marques .................. B23P 6/002 29/889.1 |
| 2004/0086635 A1 | 5/2004 | Grossklaus, Jr. et al. |
| 2005/0067061 A1 | 3/2005 | Huang et al. |
| 2005/0217110 A1 | 10/2005 | Topal |
| 2006/0124706 A1 * | 6/2006 | Raybould ............ B23K 35/325 228/262.72 |
| 2007/0044306 A1 | 3/2007 | Szela et al. |
| 2007/0145222 A1 * | 6/2007 | Rausch ............... F24F 13/0254 248/317 |
| 2007/0154338 A1 | 7/2007 | Sathian et al. |
| 2007/0163684 A1 | 7/2007 | Hu |
| 2007/0284410 A1 | 12/2007 | Budinger |
| 2008/0011813 A1 | 1/2008 | Bucci et al. |
| 2008/0087710 A1 | 4/2008 | Glaeser |
| 2009/0026182 A1 | 1/2009 | Hu et al. |
| 2009/0041611 A1 * | 2/2009 | Sathian ..................... C22F 1/10 420/439 |
| 2009/0255116 A1 | 10/2009 | McMasters et al. |
| 2010/0059573 A1 * | 3/2010 | Kottilingam ........ B23K 35/3046 228/164 |
| 2010/0257733 A1 | 10/2010 | Guo et al. |
| 2011/0180199 A1 | 7/2011 | Huxol et al. |
| 2011/0185739 A1 | 8/2011 | Bronson et al. |
| 2012/0231295 A1 | 9/2012 | Kottilingam et al. |
| 2012/0308843 A1 | 12/2012 | Ott et al. |
| 2013/0086785 A1 * | 4/2013 | Cui ..................... B23P 6/002 428/668 |
| 2013/0136941 A1 * | 5/2013 | Zheng .................... C23C 28/021 428/548 |
| 2014/0154082 A1 | 6/2014 | Shinn et al. |
| 2014/0260327 A1 | 9/2014 | Kottilingam et al. |
| 2014/0302278 A1 | 10/2014 | Bunker |
| 2014/0369741 A1 | 12/2014 | Cui et al. |
| 2015/0017018 A1 | 1/2015 | Lacy et al. |
| 2015/0090773 A1 | 4/2015 | Schick et al. |
| 2015/0224607 A1 | 8/2015 | Bruck et al. |
| 2015/0367456 A1 * | 12/2015 | Ozbaysal ............... B23K 35/30 419/23 |
| 2015/0375322 A1 * | 12/2015 | Salm ................... B23K 1/0018 428/548 |
| 2016/0151829 A1 | 6/2016 | Propheter-Hinckley et al. |
| 2016/0177749 A1 | 6/2016 | Brandl et al. |
| 2016/0230576 A1 | 8/2016 | Freeman et al. |
| 2016/0230993 A1 | 8/2016 | Dai et al. |
| 2016/0250725 A1 | 9/2016 | Henderkott et al. |
| 2016/0251965 A1 | 9/2016 | Henderkott et al. |
| 2016/0305249 A1 | 10/2016 | Crosatti et al. |
| 2016/0339544 A1 | 11/2016 | Xu et al. |
| 2016/0375461 A1 | 12/2016 | Taylor |
| 2017/0122562 A1 | 5/2017 | Berry |
| 2017/0252870 A1 | 9/2017 | Cui et al. |
| 2017/0306775 A1 | 10/2017 | Hoskin |
| 2018/0031226 A1 | 2/2018 | Burchill et al. |
| 2018/0073390 A1 | 3/2018 | Varney |
| 2018/0073396 A1 | 3/2018 | Varney |
| 2018/0093354 A1 | 4/2018 | Cui |
| 2018/0313226 A1 | 11/2018 | Henderson et al. |
| 2020/0064809 A1 | 2/2020 | Sanders et al. |
| 2020/0139493 A1 | 5/2020 | Henderkott et al. |
| 2020/0254548 A1 * | 8/2020 | Xu ..................... B23P 6/002 |

(56) References Cited

U.S. PATENT DOCUMENTS

2022/0097184 A1  3/2022  Henderkott et al.
2022/0241881 A1* 8/2022  Xu .................... B23K 1/0008

FOREIGN PATENT DOCUMENTS

| | | |
|---|---|---|
| DE | 102014226055 A1 | 6/2016 |
| EP | 1503144 A1 | 2/2005 |
| EP | 1528322 A2 | 5/2005 |
| EP | 1803521 A1 | 7/2007 |
| EP | 1880793 A2 | 1/2008 |
| EP | 1884306 A1 | 2/2008 |
| EP | 2078579 A1 | 7/2009 |
| EP | 2182092 A2 | 5/2010 |
| EP | 2186592 A1 | 5/2010 |
| EP | 2206575 A1 | 7/2010 |
| EP | 2578720 A2 | 4/2013 |
| EP | 2713007 A1 | 4/2014 |
| EP | 3095550 A1 | 11/2016 |
| JP | H09168927 A | 6/1997 |
| WO | 98/45491 A1 | 10/1998 |
| WO | 2012092279 A1 | 7/2012 |
| WO | 2014/143963 A1 | 9/2014 |
| WO | 2015147929 A2 | 10/2015 |
| WO | 2016096382 A1 | 6/2016 |

OTHER PUBLICATIONS

EP2078579A computer english translation (Year: 2021).
Examination Report from counterpart European Application No. 20154640.5, dated Jul. 14, 2020, 9 pp.
Pollock, et al., "Nickel-Based Superalloys for Advanced Turbine Engines: Chemistry, Microstructure, and Properties," Journal of Propulsion and Power, vol. 22, No. 2, Mar.-Apr. 2006, pp. 361-374.
Prosecution History from U.S. Appl. No. 16/272,664, dated Feb. 16, 2021 through Dec. 16, 2021, 38 pp.
Response to Examination Report from counterpart European Application No. 20154640.5, dated Jul. 14, 2020, filed Feb. 3, 2021, 23 pp.
Communication pursuant to Article 94(3) EPC from counterpart European Application No. 20154640.5 dated Mar. 1, 2023, 7 pp.

* cited by examiner

REPAIR OF THROUGH-HOLE DAMAGE USING BRAZE SINTERED PREFORM This application is a continuation of U.S. patent application Ser. No. 16/272,664, filed Feb. 11, 2019, the entire content of which is incorporated by reference herein.

TECHNICAL FIELD

The present disclosure generally relates to techniques for repairing alloy components.

BACKGROUND

Some articles formed from superalloys include equiaxed, directionally solidified, or a single crystal alloys and are formed using casting. Replacement of such articles in case of damage may be expensive, but repair of such articles may be difficult, particularly when damage to the article is significant in size or extends through a thickness of a portion of a component.

SUMMARY

In some examples, the disclosure describes a method including removing a portion of a base component adjacent to a damaged portion of the base component to define a repair portion of the base component. The base component may include a cobalt- or nickel-based superalloy, and the repair portion of the base component may include a through-hole extending from a first surface of the base component to a second surface of the base component. The method also may include forming a braze sintered preform to substantially reproduce a shape of the through-hole. The braze sintered preform may include a Ni- or Co-based alloy. The method additionally may include placing the braze sintered preform in the through-hole and heating at least the braze sintered preform to cause the braze sintered preform to join to the repair portion of the base component and change a microstructure of the braze sintered preform to a brazed and diffused microstructure.

The details of one or more examples are set forth in the accompanying drawings and the description below. Other features, objects, and advantages will be apparent from the description and drawings, and from the claims.

DETAILED DESCRIPTION

This disclosure describes assemblies, systems, and techniques for repairing through-hole damage to an alloy component using a braze sintered preform (BSP) material. The BSP material may include a Ni- or Co-based alloy and may include a powder or mixture of powders that has been sintered to reduce porosity of the braze material. The BSP material may facilitate repair of larger damaged portions of an article than a braze paste or loose braze powder, damaged portions that extend through a thickness of at least a portion of the article, or both. In some examples, the BSP material may be used to repair equiaxed, directionally solidified, or single-crystal Ni-based alloys or Co-based alloys, such as those used in nozzle vane guides of gas turbine engines or the like.

The BSP material may be formed or shaped to substantially fill a repair portion of the damaged article. As used herein, "substantially fill" refers to a BSP material that fills all or nearly all the repair portion of the damaged article, aside from cracks or spaces at the interface between the BSP material and the article adjacent to the repair portion. In some examples, additional braze material, such as a braze paste or an additional BSP material, may be placed adjacent to the BSP material that substantially fills the repair portion to fill or cover the damage that the BSP material does not fill, such as the cracks or spaces.

In this way, the BSP material and optional additional braze material may be used to repair damage to an article and may substantially fill the repair portion of the article. The BSP material may be used with equiaxed, directionally solidified, or single-crystal Ni-based alloy or Co-based alloy articles and may result in repaired articles in which the repaired portion may have metallurgical properties substantially similar to those of the original article. In this way, larger damaged portions of equiaxed, directionally solidified, or single-crystal Ni-based alloy or Co-based alloy articles may be repaired using the described BSP material than a braze paste or powder.

Figure 1A:
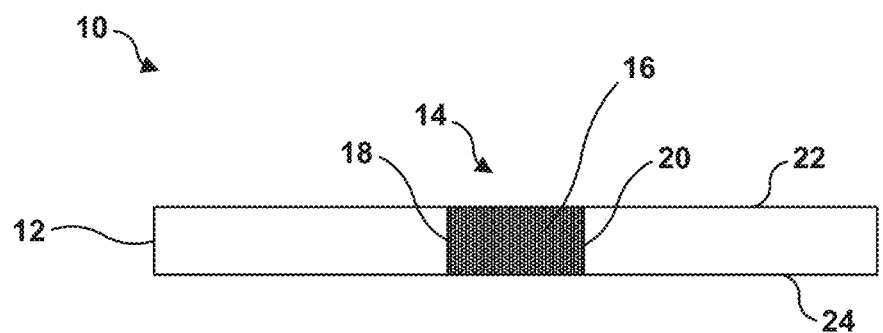
FIG. 1A is a conceptual and schematic diagram illustrating an example repaired article including a base component, a repair portion, and a braze sintered preform that substantially fills the repair portion.

FIG. 1A is a conceptual and schematic diagram illustrating an example repaired article 10 including a base component 12, a repair portion 14, and a braze sintered preform 16 that substantially fills repair portion 14. In some examples, repaired article 10 may be used as part of a high temperature mechanical system. For example, repaired article 10 may be or be part of a nozzle guide vane (NGV) that is used in a high pressure or intermediate pressure stage turbine in a gas turbine engine. In other examples, repaired article 10 may include another component of a high temperature mechanical system, such as another component of a gas turbine engine. For example, the article may include a gas turbine engine blade, gas turbine engine vane, blade track, combustor liner, honeycomb, or the like.

Base component 12 may include a metal or alloy. In some examples, base component 12 may include a Ni- or Co-based superalloy. Base component 12 may be formed from a polycrystalline alloy, a directionally solidified alloy, or a single crystal alloy. Base component 12 may include other additive elements to alter its mechanical and chemical properties, such as toughness, hardness, temperature stability, corrosion resistance, oxidation resistance, and the like, as is known in the art. Any useful superalloy may be utilized in base component 12, including, for example, Ni-based alloys available from Martin-Marietta Corp., Bethesda, Md., under the trade designation MAR-M246, MAR-M247; Ni-based alloys available from Cannon-Muskegon Corp., Muskegon, Mich., under the trade designations CMSX-3, CMSX-4, CMSX-10, and CM-186; Co-based alloys available from Martin-Marietta Corp., Bethesda, Md., under the trade designation MAR-M509; Ni-based alloys available from Special Metals Corporation, New Hartford, N.Y. under the trade designation INCONEL™ 738, INCONEL™713; and the like. The compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re |                | 3              |
| Ni | Balance        | Balance        |

Base component 12 may be made using at least one of casting, forging, powder metallurgy, or additive manufacturing.

Although FIG. 1 illustrates base component 12 as defining a simple, substantially rectangular geometry, in other examples, base component 12 may define a more complex geometry, including simple or complex curves, overhangs, undercuts, internal cavities, or the like. Examples of base component 12 that are part of a nozzle guide vane are shown in FIGS. 3A-6B.

Base component 12 has been damaged. The damage may extend through a thickness of base component 12 from first surface 22 to second surface 24. The damage may include, for example, airfoil burn-through, platform burn-through, trailing edge burn out, trailing edge burn back, leading edge burn out, a through crack, a turbine vane internal pedestal damage, blow-out failure of pressure and/or suction sides of an airfoil, foreign object damage, corrosion, or the like. As such, the damage may define a through-hole through a portion of base component 12 extending from first surface 22 to second surface 24. As shown in FIG. 1A, a damaged portion of base component 12 has been worked or machined to remove at least part of the damaged portion, defining repair portion 14. Repair portion 14 defines a through-hole through a portion of base component 12 and extends from first surface 22 to second surface 24. Compared to the damaged portion, repair portion 14 defines smoother and/or geometrically simpler repair surfaces 18 and 20 against which BSP material 16 may be positioned. This may facilitate contact between surfaces of repair portion 14 and BSP material 16. FIG. 1 illustrates repair surfaces 18 and 20 as substantially flat surfaces. In other examples, repair surfaces 18 and 20 may define other, more complex shapes, including, for example, simple or complex curves, overhangs, undercuts, or the like.

BSP material 16 is positioned in repair portion 14 and contacts repair surfaces 18 and 20. BSP material 16 includes a Ni- or Co-based alloy and may include a powder mixture that has been sintered to form a preform. Sintering may reduce porosity compared to the powder, which may reduce porosity in the repaired portion during and after repair.

BSP material 16 may include a predetermined shape. The predetermined shape may be selected to substantially fill repair portion 14 through substantially an entire depth of repair portion 14 (e.g., from first surface 22 to second surface 24). The predetermined shape may be selected after machining or working base component 12 to remove at least part of the damaged portion of base component 12 to define repair portion 14. For example, after removal of the at least part of the damaged portion, repair portion 14 may be imaged or otherwise interrogated to determine the shape of repair portion 14. BSP material 16 may then be shaped or formed to substantially match the shape of repair portion 14. Alternatively, repair portion 14 may be formed to substantially match a predefined shape of BSP material 16.

BSP material 16 may be made by forming or shaping a powder or paste into the predetermined shape (e.g., in a mold), then at least partially sintering the formed or shaped powder or paste to form BSP material 16. In this way, the shape of BSP material 16 may be tailored to the shape of repair portion 14.

Figure 1B:
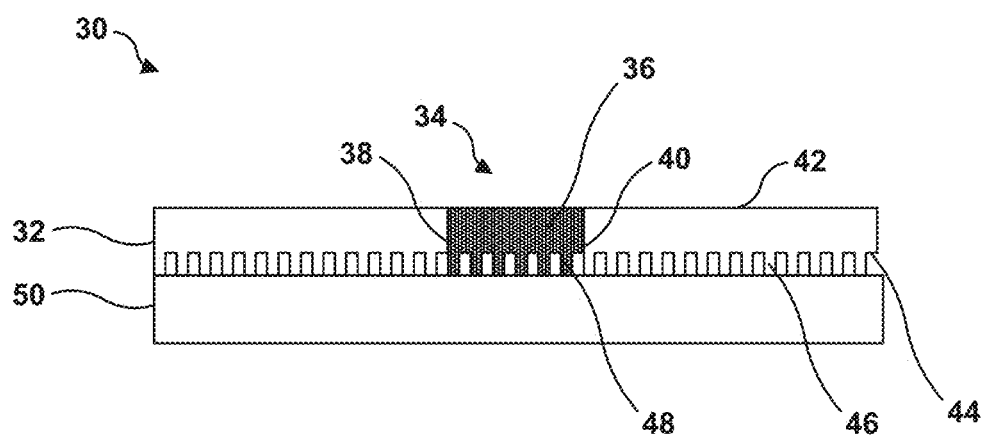
FIG. 1B is a conceptual and schematic diagram illustrating an example repaired article including a base component having three-dimensional features on a surface of the base component, a repair portion, and a braze sintered preform that substantially fills the repair portion and has three-dimensional features on a surface of the braze sintered preform.

In some examples, as shown in FIG. 1B, a repaired article may include a base component that defines a more complicated shape, such as three-dimensional surface features. FIG. 1B is a conceptual and schematic diagram illustrating an example repaired article 30 including a base component 32 having three-dimensional features 46 on a surface 44 of the base component 32, a repair portion 34, and a BSP material 36 that substantially fills the repair portion 34 and has three-dimensional features 48 on a surface of the BSP material. Like base component 12 of FIG. 1A, base component 32 of FIG. 1B defines a repair portion 34 including repair surfaces 38 and 40. Base component 32 also defines a first surface 42 and a second surface 44.

Unlike base component 12 of FIG. 1A, base component 32 is not the only part of repaired article 30. Repaired article 30 also includes a second component 50 to which base component 32 is attached or joined. For example, repaired article 30 may be a turbine nozzle guide vane component in which base component 32 is a pressure side airfoil wall, second component 50 is a suction side airfoil wall, and three-dimensional surface features 46 on airfoil inner surface 44 of base component 32 are pedestals, cooling features, or the like. As another example, repaired article 30 may be a dual wall component in which base component 32 is an outer wall, second component 50 is an inner wall or spar, and three-dimensional surface features 46 on inner surface 44 of base component 32 are pedestals, cooling features, or the like. The damaged portion and repair portion 34 define a through-hole extending through base component 32 from first surface 42 to second surface 44, but may or may not extend through second component 50.

Unlike base component 12 of FIG. 1A, second surface 44 of base component 32 defines three-dimensional surface features 46, such as cooling features, pedestals or stand-offs, or the like. The damaged portion of base component 32 may have included similar three-dimensional surface features 46. As such, in order to fully repair the damaged portion of base component 32, BSP material 36 may be formed to include substantially similar three-dimensional features 48 on a surface of BSP material 36 that is placed adjacent to (e.g., parallel with) second surface 44 of base component 32. The three-dimensional features may be formed during the sintering process or after the sintering process using a machining process such as milling, grinding, waterjet, laser, electrodischarge machining, or the like. By including three-dimensional features 48, BSP material 36 may substantially fill repair portion 34 and may replace substantially all of the damaged portion of base component 32.

BSP material 16 and BSP material 36 (referred to collectively as "BSP material 16") may include a Ni-based or Co-based alloy. In some examples, BSP material 16 may include greater amounts of alloying elements that some other braze materials used in braze foils, which may contribute to improved mechanical properties, chemical properties, or both compared to some other braze materials used in braze foils. For example, BSP material 16 may possess sufficient mechanical strength and high temperature oxidation resistance to be used in a nozzle guide vane in a gas turbine engine.

In some examples, BSP material 16 may include both a braze alloy powder (e.g., a relatively low-melt powder composition) and a superalloy powder (e.g., a relatively high-melt powder composition). The low-melt alloy powder composition is an alloy, or a mixture of alloys, that substantially melts below the braze temperature (hence the name "low-melt" or "braze powder"). In contrast, the high-melt alloy powder composition is an alloy, or a mixture of alloys, that remains substantially unmelted at the braze temperature, because the composition has a melting temperature above the braze temperature (hence the name "high-melt" or "superalloy powder"). In some implementations, the braze alloy powder and the superalloy powder may have specific powder mesh sizes, and may be produced by induction melting the braze alloy or the superalloy powder, respectively, in vacuum or an argon atmosphere, followed by argon gas atomization. Each individual powder component used in BSP material 16 may be analyzed to confirm the particle size and chemical compositions.

In some examples, the low-melt powder composition includes an alloy or a mixture of alloys that melt at a temperature below about 1240° C. (about 2265° F.), with the alloy or mixture of alloys being selected so that the low-melt powder composition as a whole substantially melts at a temperature between about 1093° C. (about 2000° F.) and about 1204° C. (about 2200° F.). The high-melt alloy powder composition may include a single high-melt alloy or a mixture of alloys that melts at a temperature of greater than about 1315° C. (about 2400° F.).

In some examples, the low-melt powder composition may include one or more alloy powders and includes between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1240° C. (about 2265° F.). In some examples, the low-melt powder composition also includes up to about 1 wt. % each of at least one of Ti, W, Mo, Re, Nb, Hf, Pd, Pt, Jr, Ru, C, Si, P, Fe, Ce, La, Y, or Zr. In some examples the low-melt alloy powder comprises a mixture of two or more low-melt alloys. For example, a low-melt alloy powder may include (a) about 35% of a first low-melt powder including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt powder including about 42 wt. % Ni, about 31 wt. % Cr, about 26 wt. % Ta, and about 1 wt. % B, with a liquidus temperature of about 1240° C. (about 2265° F.); and (c) about 20 wt. % of a third low-melt powder including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.).

In some examples, the high-melt powder composition may include an alloy or mixture of alloys with a chemistry that is the similar to or substantially the same (e.g., the same or nearly the same) as the alloy in first component 12, second component 14, or both. For example, in some implementations, to join a first component 12 and a second component 14 that include Ni-based superalloy components such as those made of MAR-M246 or 247 or 002, or CMSX-3 or -4, the high-melt powder composition may include between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, between about 2 wt. % and about 4 wt. % Re, up to about 3 wt. % Mo, and up to about 3 wt. % Hf. In some examples, the high-melt powder composition also may include up to about 1 wt. % each of at least one of Ti, Nb, C, B, Si, or Zr. In some examples, the high-melt powder composition includes between about 55 wt. % and about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

The low-melt powder composition and the high-melt powder composition may be combined in any selected ratio. In some examples, BSP material 16 may include a powder mixture consisting of between about 20 wt. % and about 80 wt. % low-melt powder composition and a balance high-melt powder composition (a ratio of between about 1:4 and about 4:1 low-melt:high-melt powder). In some cases, braze alloy powder may be a mixture of more than one braze alloys which are all powder. In some examples, the ratio may be between about 1:3 and about 3:1 low-melt:high-melt powder, such as a ratio between about 1:2 and about 2:1 low-melt:high-melt powder, or a ratio between about 1:1 and about 1:1.5 low-melt:high-melt powder. For example, BSP material 16 may include between about 40 wt. % and about 50 wt. % low-melt alloy powder and between about 50 wt. % and about 60 wt. % high-melt powder, such as about 45 wt. % low-melt alloy powder and about 55 wt. % high-melt powder.

Hence, in some examples, BSP material 16 may include between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B. In some examples, BSP material 16 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Ir, Ru, C, B, Si, P, Mn, Fe, Ce, La, Y, or Zr. In some examples, BSP material 16 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, between about 0.5 wt. % and about 1 wt. % Mo, between about 0.5 wt. % and about 1 wt. % Hf, between about 0.1 wt. % and about 0.5 wt. % Nb, between about 0.05 wt. % and about 3 wt. % Si, and between about 0.5 wt. % and about 2 wt. % B. In some examples, BSP material 16 may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between about 8.2 wt. % and about 8.8 wt. % Ta, between about 0.6 wt. % and about 0.8 wt. % B, about 0.3 wt. % Si, between about 1.5 wt. % and about 1.8 wt. % Re, between about 0.8 wt. % and about 0.9 wt. % Hf, between about 0.1 wt. % and about 0.2 wt. % Nb, and a balance Ni.

BSP material 16 may include between 0.05 and 0.116 wt. % C, between 0.11 and 0.376 wt. % Si, between 8.424 wt. % and 11.640 wt. % Cr, between 0.284 wt. % and 0.835 wt. % B, between 4.8 wt. % and 5.8 wt. % Al, between 2.675 wt. % and 4.232 wt. % W, between 0.650 wt. % and 1.362 wt. % Mo, between 1.4 wt. % and 2.462 wt. % Re, between 7.184 wt. % and 8.942 wt. % Ta, between 0.690 wt. % and 1.386 wt. % Hf, and between 8.725 wt. % and 10.964 wt. % Co, and a balance Ni. Additionally and optionally, BSP material 16 may include a maximum of 0.082 wt. % Mn, a maximum of 0.003 wt. % S, a maximum of 0.013 wt. % P, a maximum of 0.018 wt. % Ti, a maximum of 0.161 wt. % Y, a maximum of 0.034 wt. % Zr, a maximum of 0.180 wt. % Fe, a maximum of 0.093 wt. % V, a maximum of 0.10 wt. % Cu, a maximum of 0.007 wt. % Mg, a maximum of 0.084 wt. % O, a maximum of 0.030 wt. % N, a maximum of 0.242 wt. % P, and a maximum of 0.150 wt. % other elements.

BSP material 16 may include about 0.3 wt. % Si, about 11.4 wt. % Cr, about 0.8 wt. % B, about 4.9 wt. % Al, about 2.8 wt. % W, about 0.8 wt. % Mo, about 1.5 wt. % Re, about 52 wt. % Ni, about 0.2 wt. % Nb, about 8.8 wt. % Ta, about 0.8 wt. % Hf, and about 9 wt. % Co. As another example, BSP material may include about 0.3 wt. % Si, about 10.2 wt. % Cr, about 0.6 wt. % B, about 5.2 wt. % Al, about 3.3 wt. % W, about 0.9 wt. % Mo, about 1.8 wt. % Re, about 52.1 wt. % Ni, about 0.2 wt. % Nb, about 8.1 wt. % Ta, about 1.0 wt. % Hf, and about 9.6 wt. % Co. As another example, BSP material 16 may include about 0.2 wt. % Si, about 8.6 wt. % Cr, about 0.3 wt. % B, about 5.7 wt. % Al, about 4.1 wt. % W, about 1.2 wt. % Mo, about 2.3 wt. % Re, about 52.2 wt. % Ni, about 0.1 wt. % Nb, about 7.3 wt. % W, about 1.2 wt. % Hf, and about 10.7 wt. % Co. Such alloys may be well suited for repairing single crystal Ni-based superalloys, such as those used in nozzle guide vanes of gas turbine engines.

In selecting the proportions of components used in BSP material 16, higher weight percentages of high-melt powder may provide better mechanical properties in view of their reduced levels of boron, silicon, or both. Conversely, higher percentages of low-melt powders may provide improved braze flow. A proper balance between mechanical properties and braze flow should be selected.

In some examples, BSP material 16 that includes higher Al content may possess improved high-temperature oxidation resistance properties compared to BSP material 16 with lower Al content. Further, increasing Ta content in BSP material 16 may improve mechanical properties of the braze joint compared to lower Ta content. In particular, Ta may strengthen the gamma nickel and gamma prime nickel aluminide phases by increasing lattice mismatches.

BSP material 16 may be formed by mixing an alloy powder or multiple alloy powders in a selected composition, then sintering the powder while disposed in a mold to form a sintered preform with reduced porosity. The sintering temperature and the duration of the sintering may depend at least in part on the composition of the alloy powder or multiple alloy powders. The mold shape may be selected so that BSP material 16 substantially fills repair portion 14 or may be selected to result in a BSP material 16 that may be cut or machined to substantially fill repair portion 14.

In some examples, the sintered powder may then be cut or machined into a predetermined shape. For example, the predetermined shape may correspond to a shape of repair portion 14. As described above, repair portion 14 may include a relatively simple geometry as shown in FIG. 1A, or may include a more complex geometry, e.g., as shown in FIG. 1B. Accordingly, the sintered powder may be cut or machined into a relatively simple shape, or a more complex shape, e.g., including curvature, angles, apertures, three-dimensional surface features, or the like to form BSP material 16. Regardless of the complexity of the shape of BSP material 16 and depending upon the geometry of repair portion 14, BSP material 16 may include a substantially two-dimensional shape (e.g., a plane) or a three-dimensional shape (e.g., including curvature, planes at angles with respect to one another, and the like).

By utilizing BSP material 16, alloys with desirable mechanical and chemical (e.g., high temperature oxidation resistance) may be utilized in a brazing technique to repair damage to base component 12. The resulting repaired portion may possess sufficient mechanical strength and high temperature oxidation resistance to be utilized in a high temperature mechanical system, such as a nozzle guide vane in a gas turbine engine. Further, by utilizing a BSP material 16, the repaired portion may include reduced porosity compared to a joint formed using a braze powder, positioning of the braze material may be easier and more precise than with a braze powder, and larger damaged portions may be repaired, including damaged portions that include through-holes extending from a first surface of a base component to a second surface of the base component.

Figure 2:
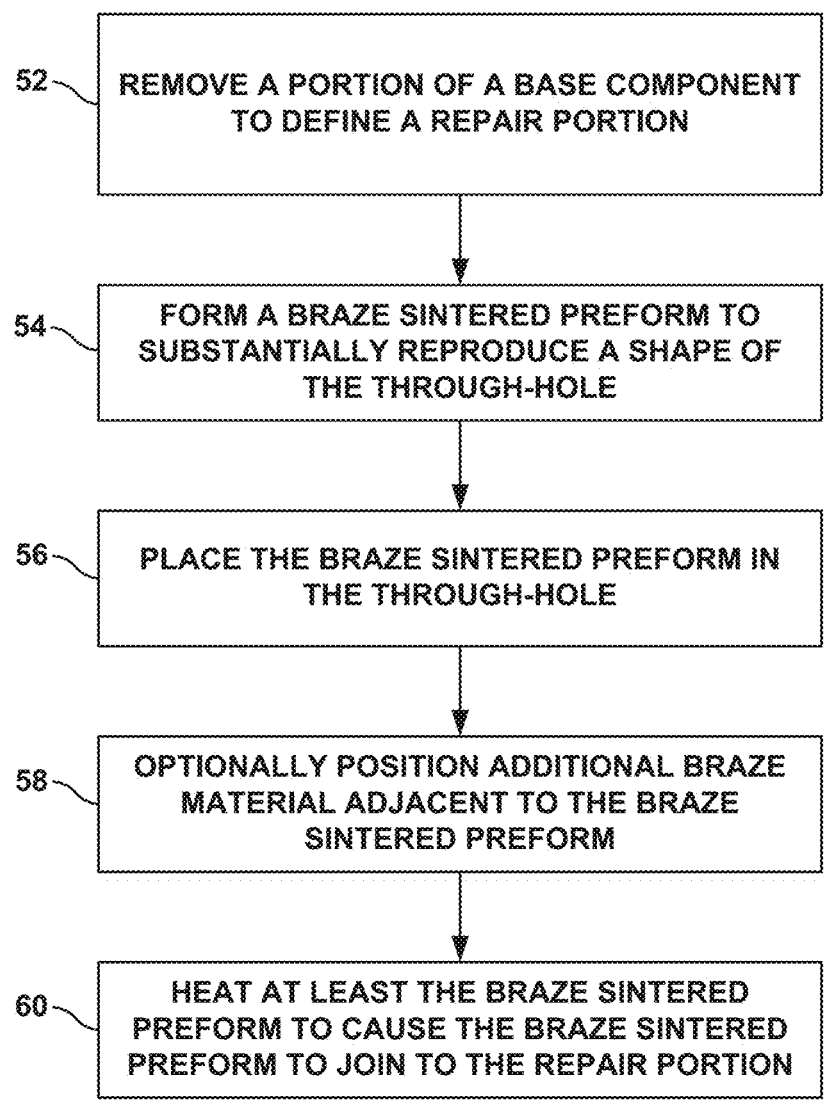
FIG. 2 is a flow diagram illustrating an example technique for repairing a damaged portion including a through-hole using a BSP material.

FIG. 2 is a flow diagram illustrating an example technique for repairing a damaged portion including a through-hole using a BSP material. The technique of FIG. 2 will be described with reference to repaired article 10 of FIG. 1A for purposes of illustration only. It will be appreciated that the technique of FIG. 2 may be performed with a different article, or that article 10 may be used in a different repair technique.

The technique of FIG. 2 includes removing a portion of base component 12 adjacent to a damaged portion of base component 12 to define repair portion 14 (52). Repair portion 14 includes a through-hole that extends from first surface 22 of base component 12 to second surface 24 of base component 12. Repair portion 14 defines repair surfaces 18 and 20, which may be smoother and/or geometrically simpler than the surfaces of the damaged portion. In some examples, the removed portion of base component 12 may be sufficiently large to remove all damage from base component 12. In other examples, the removed portion of base component 12 may not remove all damage. For example, the removed portion of base component 12 may include any damaged portions that significantly deviate from the original geometry of base component 12, e.g., by protruding from the surface of base component 12, but may leave smaller damaged areas, such as smaller cracks that may or may not extend through a thickness of base component.

Although not shown in FIG. 2, in some examples, after removing the portion of base component 12 adjacent to the damaged portion of base component 12 to define repair portion 14 (52), repair surface 18, repair surface 20, first surface 22, and/or second surface 24 may be inspected and cleaned. Cleaning may include removing chemically damaged portions of the surface, e.g., portions of surfaces 18, 20, 22, and/or 24 that were burned or oxidized, removing coatings on surface 22 and/or surface 24, or the like. The cleaning may be accomplished mechanically, chemically, electrochemically, or the like. For example, one or more of surfaces 18, 20, 22, or 24 may be ground, sanded, grit-blasted, chemically mechanically polished, etched, or the like to clean the surface. The cleaned surfaces may produce a stronger joint to BSP material 16 than uncleaned surfaces.

The technique of FIG. 2 includes forming BSP material 16 to substantially reproduce a shape of the through-hole of repair portion 14 (54). BSP material 16 may be formed by mixing an alloy powder or multiple alloy powders in a selected composition, then sintering the powder while the powder is disposed in a mold to form a sintered preform with reduced porosity. The sintering temperature and the duration of the sintering may depend at least in part on the composition of the alloy powder or multiple alloy powders. The mold shape may be selected so that BSP material 16 substantially fills repair portion 14 or may be selected to result in a BSP material 16 that may be cut or machined to substantially fill repair portion 14.

In some examples, the sintered powder may then be cut or machined into a predetermined shape. For example, the predetermined shape may correspond to a shape of repair portion 14, such that BSP material 16 substantially fills a width and depth (e.g., a volume) of repair portion 14. As described above, repair portion 14 may include a relatively simple geometry as shown in FIG. 1A, or may include a more complex geometry, e.g., as shown in FIG. 1B. Accordingly, the sintered powder may be cut or machined into a relatively simple shape, or a more complex shape, e.g., including curvature, angles, apertures, three-dimensional surface features, or the like to form BSP material 16. Regardless of the complexity of the shape of BSP material 16 and depending upon the geometry of repair portion 14, BSP material 16 may include a substantially two-dimensional shape (e.g., a plane) or a three-dimensional shape (e.g., including curvature, planes at angles with respect to one another, and the like).

The technique of FIG. 2 then includes placing BSP material 16 in repair portion 14 (56). For example, as shown in FIG. 1A, BSP material 16 may be placed to contact repair surfaces 18 and 20 of repair portion 14. In some examples, BSP material 16 may be tack welded in place to maintain the position of BSP material 16 relative to base component 12 prior to heating BSP material 16. For example, BSP material 16 may be tack welded using resistance welding.

In some examples, the technique of FIG. 2 may optionally include positioning additional braze material adjacent to BSP material 16 (58). In some examples, additional braze material may be positioned adjacent to BSP material 16 (58) prior to heating at least the BSP material 16 (60). The additional braze material may include a Ni- or Co-based alloy, such as a Ni- or Co-based alloy with a composition substantially similar to that of BSP material 16. The additional braze material may include a second BSP material, such as a sheet or foil; a braze paste; a braze powder; or the like. The additional braze material may be positioned adjacent to BSP material 16 to fill or cover parts of repair portion 14 or adjacent damage that BSP material 16 does not fill. For example, the additional braze material may be positioned in cracks or spaces not filled by BSP material 16, may be placed over BSP material 16, contacting first surface 22 or second surface 24 to provide a substantially continuous surface after heating, or the like. In some examples, multiple additional braze materials, such as multiple additional BSP materials, or an additional BSP material and a braze paste or powder, may be positioned adjacent to BSP material 16 (58).

In examples in which a braze powder or braze paste are used as the additional braze material, positioning additional braze material adjacent to BSP material 16 (58) may include positioning braze stop material at selected locations of base component 12 to retain the additional braze material at desired locations of base component 12 during heating. The selected locations of base component 12 may include external locations (e.g., on an exterior surface), internal locations (e.g., within internal cavities), or both.

The technique of FIG. 2 further includes heating at least BSP material 16 to join BSP material 16 to base component 12 and change the microstructure of BSP material 16 to a brazed and diffused microstructure (60). In some examples, BSP material 16 may be heated in a furnace or other closed retort, and base component 12 may be heated with BSP material 16. In some examples, the furnace or closed retort may enclose a vacuum or substantially inert atmosphere (e.g., an atmosphere including constituents that substantially do not react with base component 12 and BSP material 16 at the temperatures and pressures experienced by the interior of the furnace or closed retort). In some examples, BSP material 16 may be heated at a braze temperature of between about 1093° C. (about 2000° F.) and about 1288° C. (about 2350° F.), such as a braze temperatures of about 1260° C. (about 2300° F.). The time for which BSP material 16 is heated at the braze temperature may vary from about 10 minutes to about 60 minutes, for example between about 20 to 40 minutes.

In some examples, rather than placing BSP material 16 (56) and additional (optional) braze material (58) before heating at least BSP material 16 (60), at least BSP material 16 may be heated to join BSP material 16 to base component 12 (60) before additional braze material is positioned adjacent to BSP material 16 (58). Once additional braze material is positioned adjacent to BSP material 16 (58) at least the additional braze material may be heated to join the additional braze material to BSP material 16 and/or base component 12. For example, the additional braze material may be heated using similar or substantially the same heat treatment parameters as described above with reference to BSP material 16.

BSP material 16 then may be allowed to cool to ambient temperature to form a solid and join to base component 12. In some examples, as part of heating at least BSP material 16 to join BSP material 16 to base component 12 and change the microstructure of BSP material 16 to a brazed and diffused microstructure (60), BSP material 16 may be subjected to a diffusion heat treatment cycle. For example, at least BSP material 16, and possibly BSP material 16 and base component 12, may be heated in a vacuum furnace back filled with argon gas maintaining at a pressure between 100 to 800 microns Hg at a temperature between about 1000° C. and about 1200° C. for between about 4 hours and about 24 hours. For example, between about 1038° C. and about 1149° C. for at least 17 hours at least BSP material 16, and possibly BSP material 16 and base component 12, may be heated in a vacuum furnace back filled with argon gas maintaining at a pressure between 100 to 800 microns Hg at a temperature between about 1038° C. and about 1149° C. for at least 17 hours. The diffusion heat treatment may allow smaller alloying additions from the low melt braze powder (e.g., boron and silicon) to diffuse into the adjacent high melt powder in BSP material 16 and into base component 12 to create a more homogeneous microstructure and increase the re-melting temperature of the repaired structure.

In some examples, at least BSP material 16 may be machined after completion of heat treatments to remove excess BSP material 16 and restore base component 12 to a nominal part geometry.

EXAMPLES

Example 1

Figure 3A:
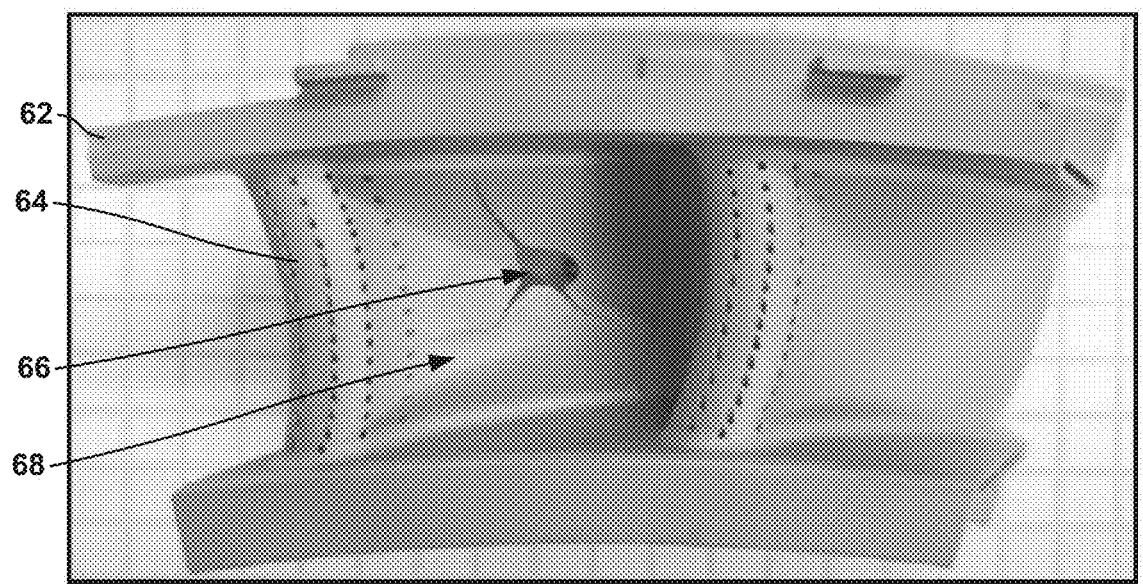
FIGS. 3A-3J are photographs illustrating an example nozzle guide vane during various stages of repair of a damaged vane airfoil.
Figure 3B:
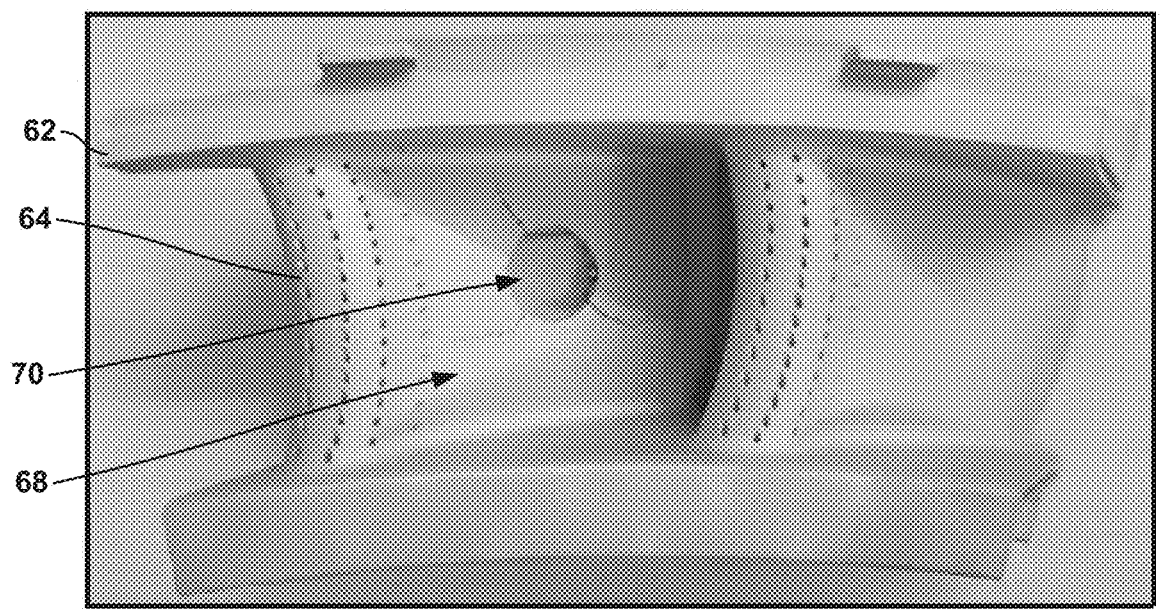
Figure 3C:
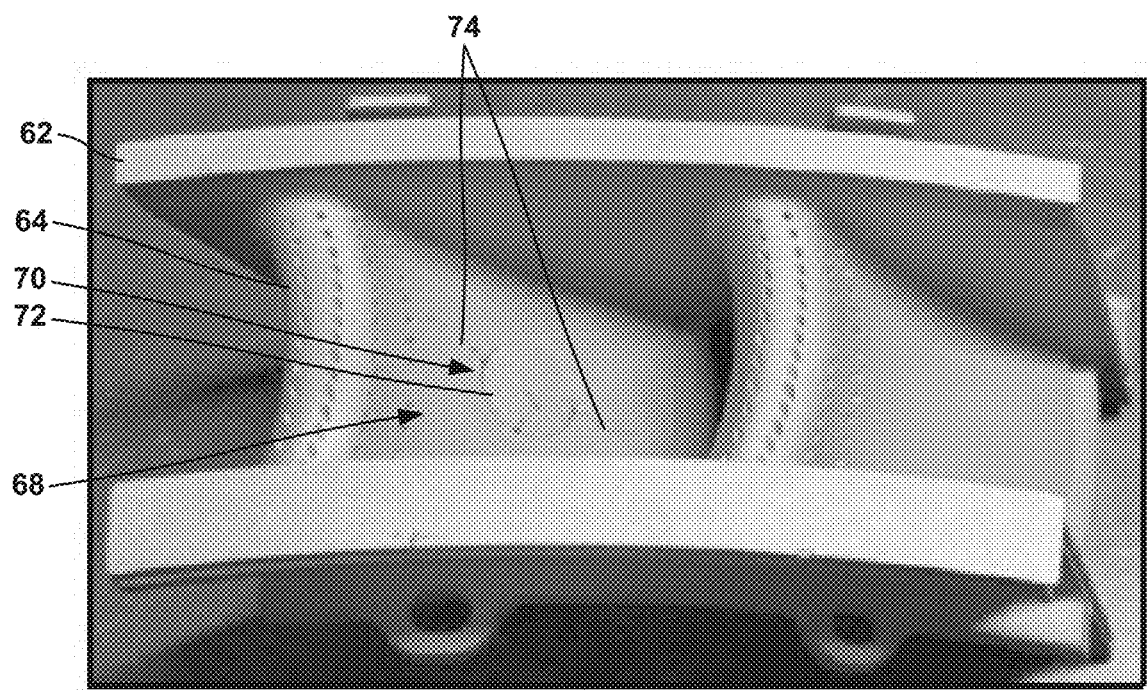
Figure 3D:
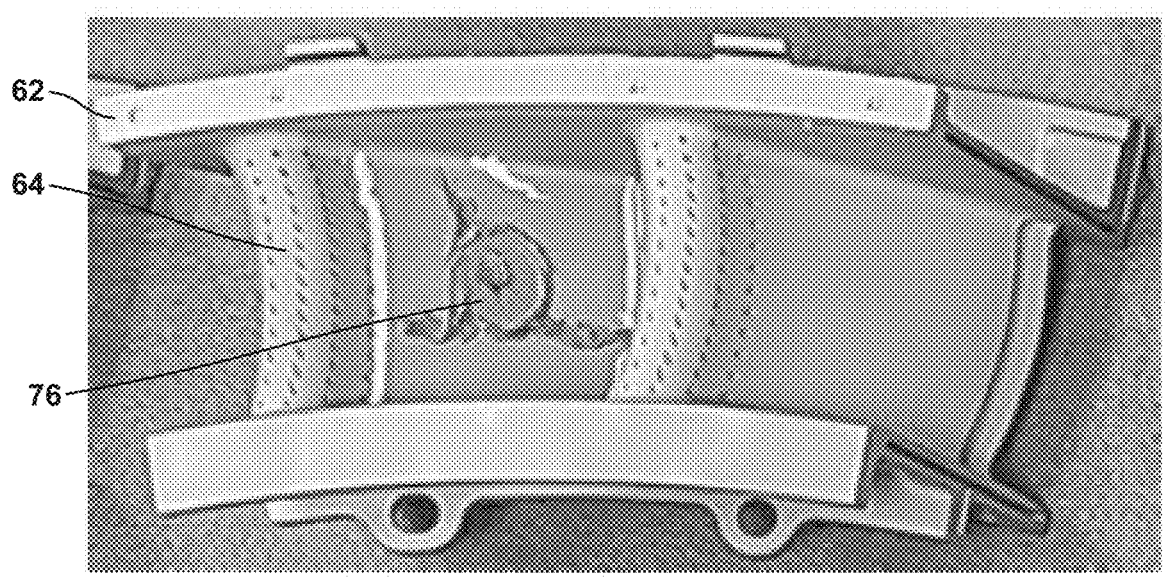
Figure 3E:
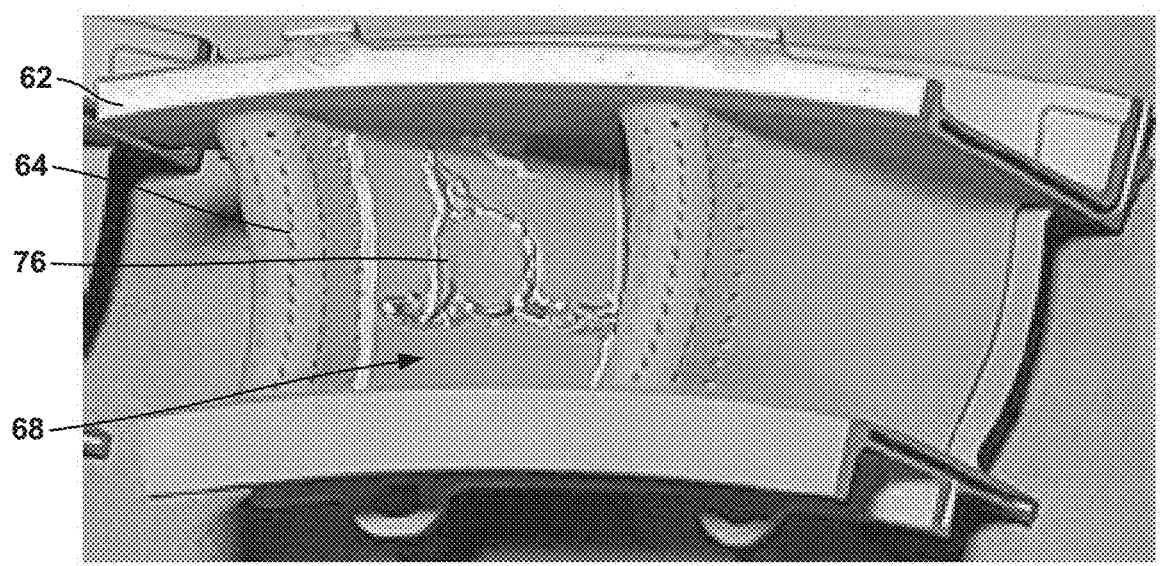
Figure 3F:
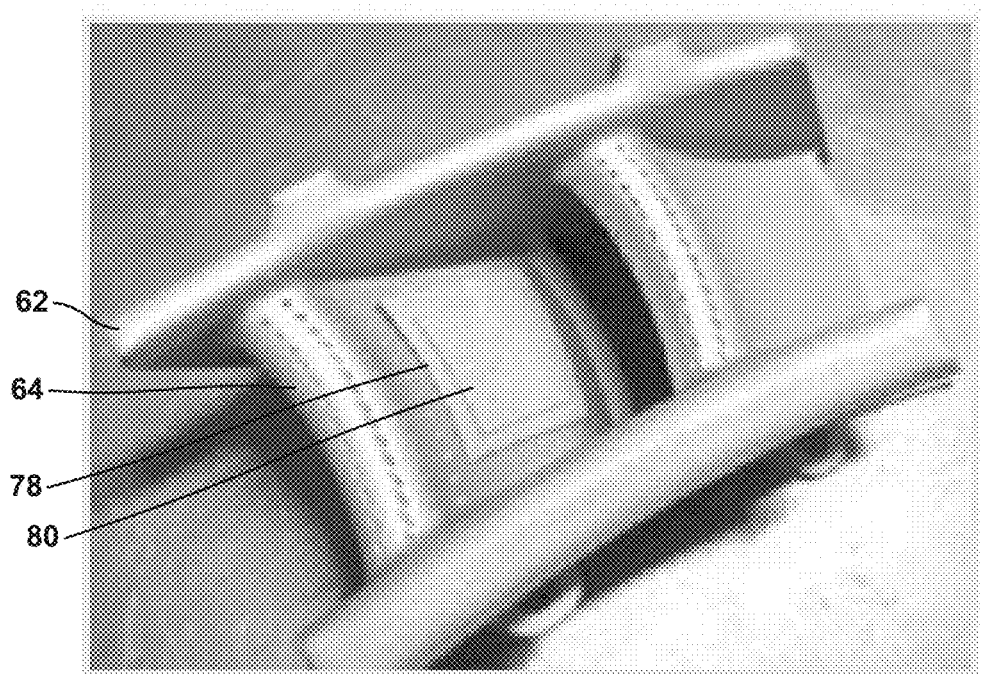
Figure 3G:
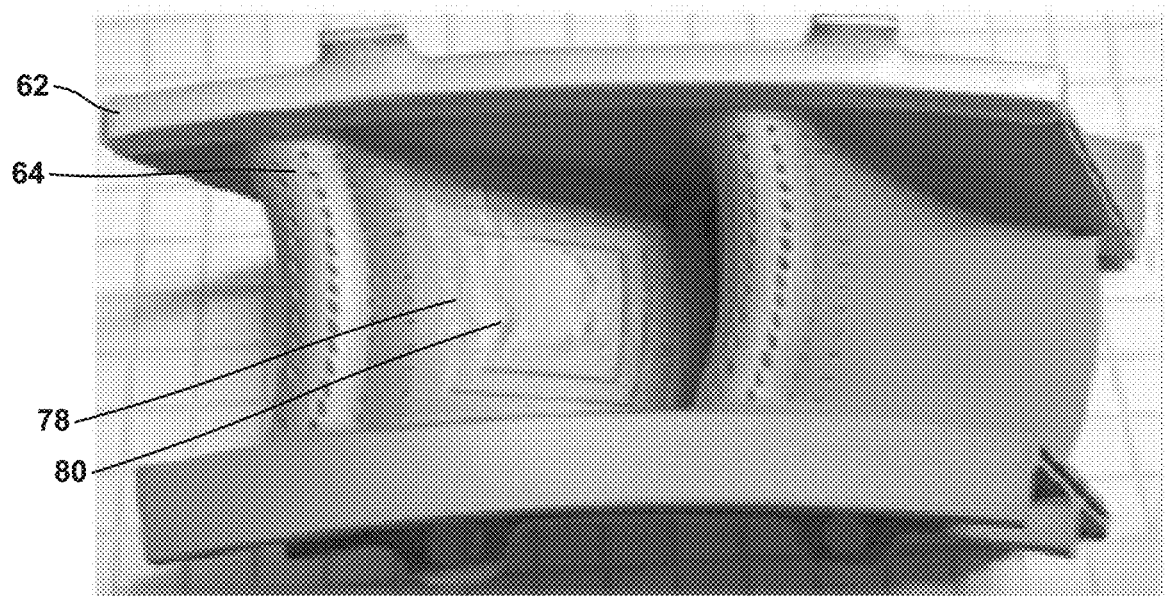
Figure 3H:
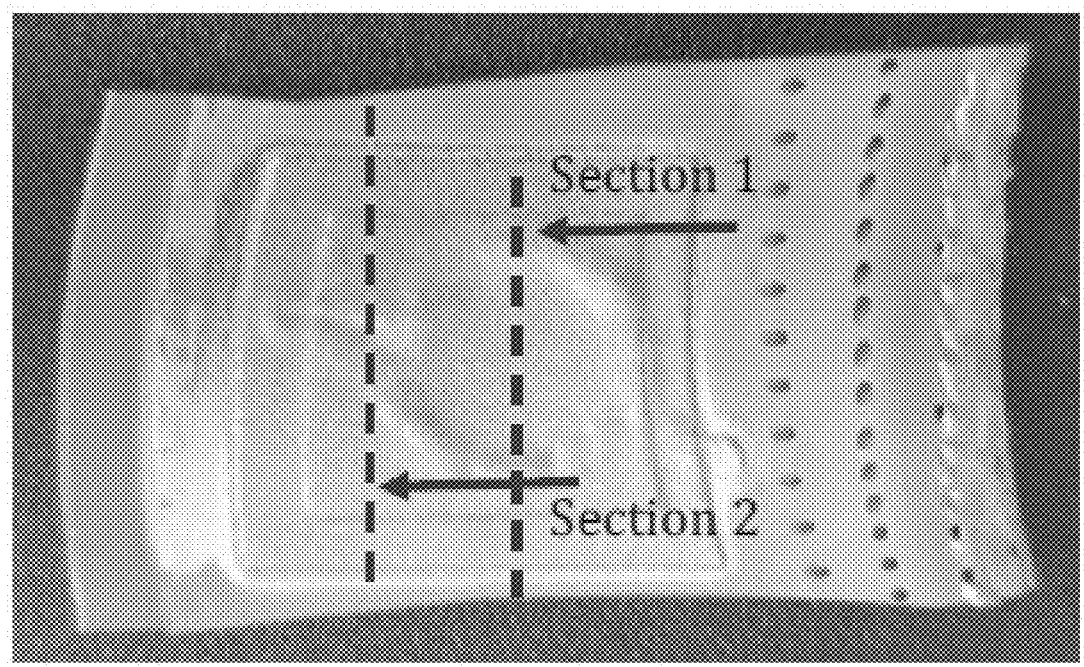
Figure 3I:
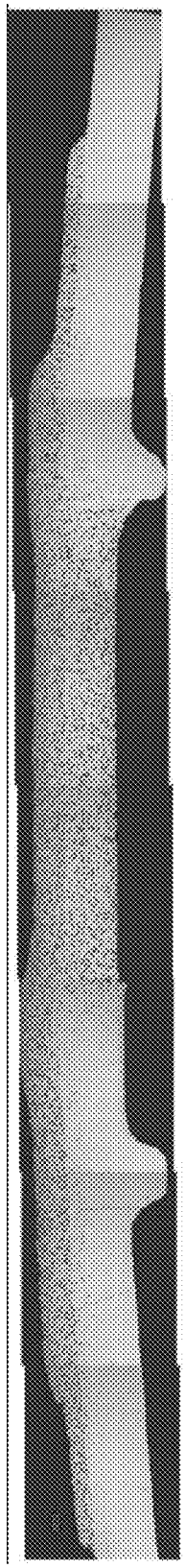
Figure 3J:
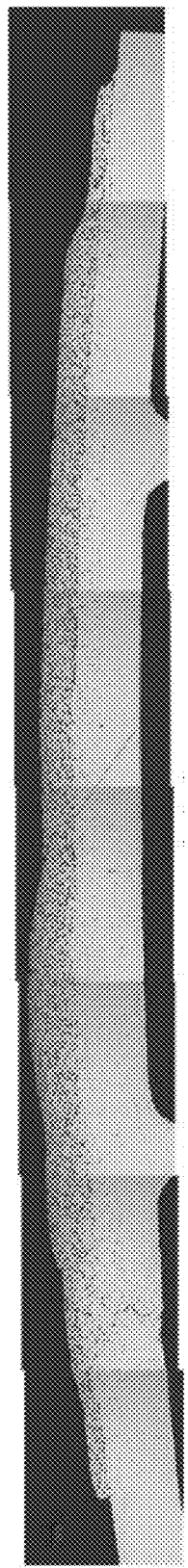

FIGS. 3A-3J are photographs illustrating an example nozzle guide vane during various stages of repair of a damaged vane airfoil. As shown in FIG. 3A, the airfoil 64 of nozzle guide vane 62 suffered burn through damage 66 on the pressure side 68 of the airfoil 64. FIG. 3B shows nozzle guide vane 62 after removing a portion of airfoil 64 adjacent to the burn through damage 66 to define a ⅜ inch diameter through-hole 70. FIG. 3C shows the airfoil with a BSP material 72 placed in through-hole 70. As shown in FIG. 3C, additional cracks 74 are present in the airfoil adjacent to the repair portion through-hole. FIG. 3D shows additional braze material in the form of braze paste 76 applied to the airfoil 64, including within additional cracks 74, with braze stop-off material on the airfoil 64 to maintain the braze paste 76 in desired locations. The braze stop-off material also may be applied inside airfoil 64, which is not shown in the figures. FIG. 3E shows the airfoil 64 after a first brazing cycle has been completed to join the BSP material 72 and braze paste 76 to the vane airfoil 64, to repair through-hole and additional cracks 74 and to change BSP material 72 and braze paste 76 into a brazed microstructure. FIG. 3F shows two additional BSP materials 78 and 80 placed over the repair portion. Each BSP material 78 and 80 in FIG. 3F was about 0.010 inch thick. The additional BSP materials 78 and 80 were resistance tack welded to the surface of the vane airfoil 64. FIG. 3G shows the vane airfoil 64 after a second brazing cycle to join the additional BSP materials 78 and 80 to the vane airfoil 64. FIG. 3H shows the locations of the two sections shown in FIG. 3I (section 1) and 3J (section 2). As shown in FIGS. 3I and 3J, the BSP filled substantially the entire depth of the repair portion through-hole 70 and additional cracks 74.

Example 2

Figure 4A:
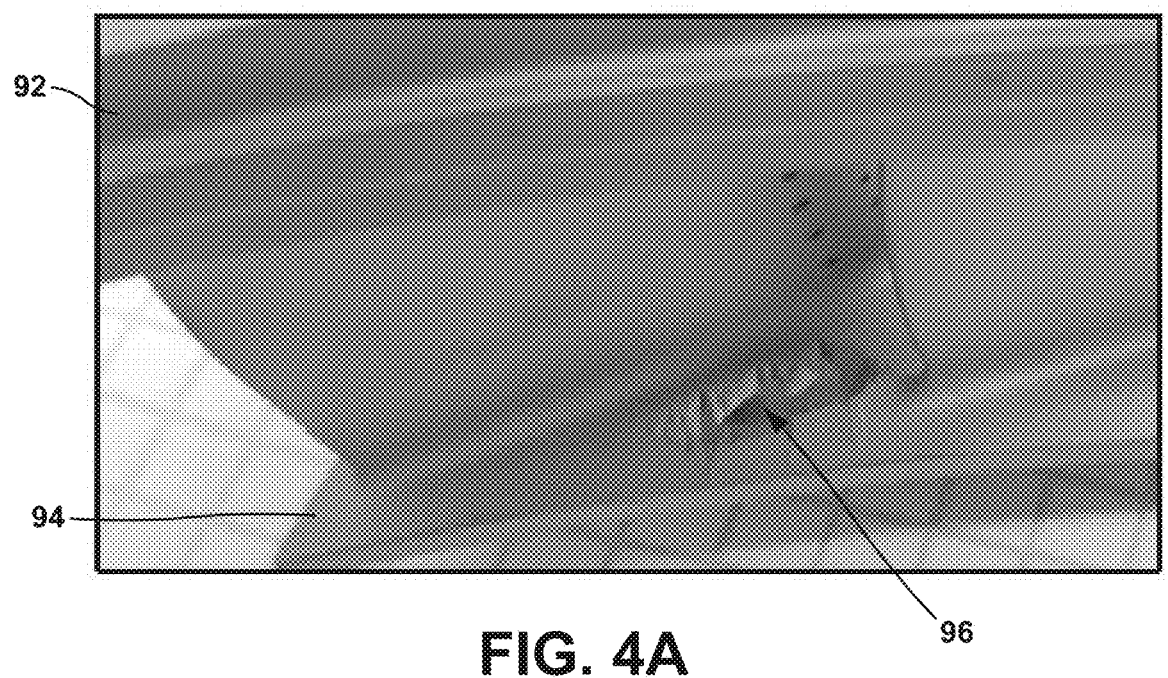
FIGS. 4A-4D are photographs illustrating an example nozzle guide vane during various stages of repair of a damaged platform.
Figure 4B:
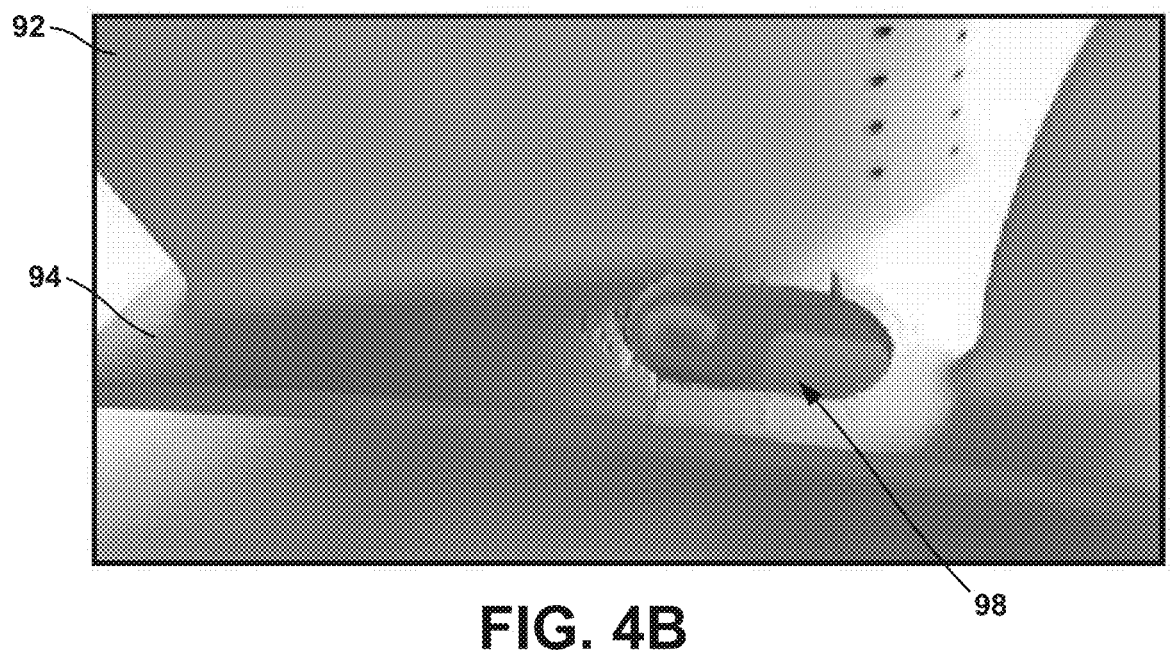
Figure 4C:
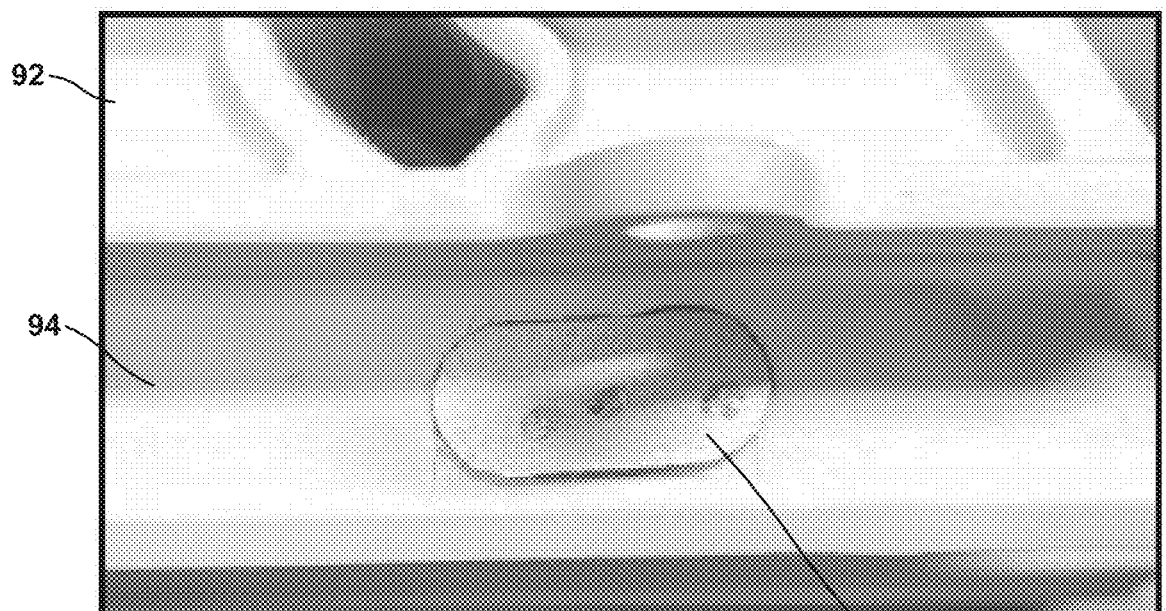
Figure 4D:
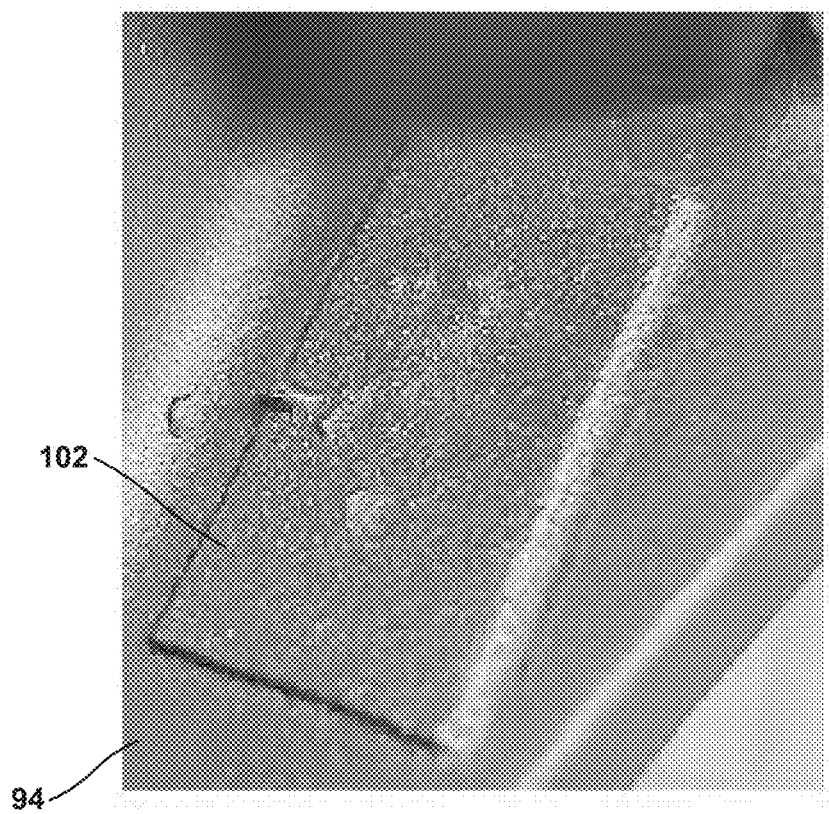

FIGS. 4A-4D are photographs illustrating an example nozzle guide vane 92 during various stages of repair of a damaged platform 94. FIG. 4A shows platform burn-through damage 96. FIG. 4B shows the platform 94 after removing a portion of the platform 94 adjacent to the damage 96 to define a through-hole 98. FIG. 4C shows the platform 94 with a BSP material 100 placed in the through-hole 98 and resistance tack welded in place. FIG. 4D shows additional BSP material 102 place on a surface of the platform over the BSP material 100 in the through-hole 98, after heating to join the BSP material 100 to the platform 94.

Example 3

Figure 5A:
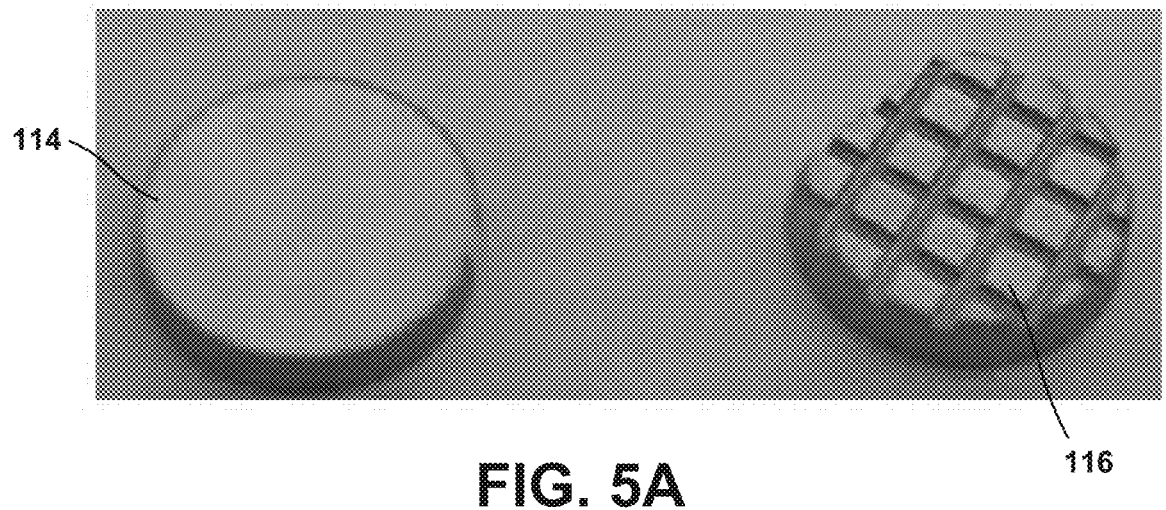
FIGS. 5A and 5B are photographs illustrating an example BSP material having three-dimensional surface features and a repaired vane airfoil including the BSP material having the three-dimensional surface features.
Figure 5B:
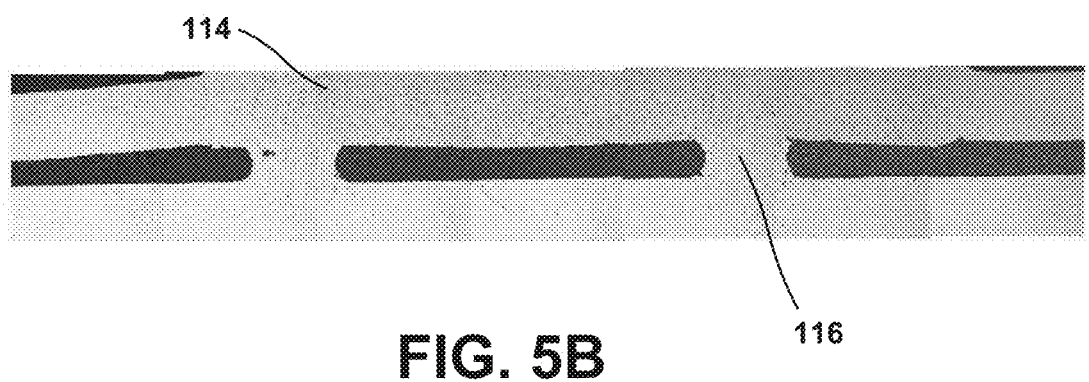

FIGS. 5A and 5B are photographs illustrating an example BSP material 114 having three-dimensional surface features 116 and a repaired vane airfoil including the BSP material 114 having the three-dimensional surface features 116.

Various examples have been described. These and other examples are within the scope of the following claims.

What is claimed is:

1. A method for repairing an article, the method comprising:
removing a portion of a base component of the article, the base component being adjacent to a damaged portion of the base component to define a repair portion of the base component,
wherein the base component comprises a cobalt- or nickel-based superalloy, and wherein the repair portion of the base component comprises a through-hole extending from a first surface of the base component to an inner surface of the base component;
forming a braze sintered preform to substantially reproduce a shape of the through-hole, wherein the braze sintered preform comprises a Ni- or Co-based alloy;
placing the braze sintered preform in the through-hole; and
heating at least the braze sintered preform to cause the braze sintered preform to join to the repair portion of the base component and change a microstructure of the braze sintered preform to a brazed and diffused microstructure,
wherein the braze sintered preform comprises three-dimensional surface features on a first side of the braze sintered preform, wherein the first side of the braze sintered preform in positioned adjacent the inner surface of the base component, and wherein the three-dimensional surface features substantially reproduce three-dimensional surface features of the damaged portion of the inner surface of the base component,
wherein the article further comprises a second component defining a surface opposing the inner surface of the base component,
wherein the article comprises a dual wall component, wherein the base component forms an outer wall of the dual wall component, and wherein the second component defines an inner wall with the inner surface opposing the inner surface of the base component,
wherein the three-dimensional surface features of the braze sintered preform comprise at least one of a pedestal or a cooling feature, wherein the at least one of the pedestals or the cooling feature substantially reproduce at least one of a pedestal or a cooling feature of the damaged portion of the inner surface of the outer wall.

2. The method of claim 1, wherein placing the braze sintered preform in the through-hole comprising placing the braze sintered preform such that the first side is substantially parallel to the inner surface of the base component.

3. The method of claim 1, wherein the braze sintered preform substantially fills a depth of the through-hole.

4. The method of claim 1, further comprising spot welding the braze sintered preform in place relative to the base component prior to heating at least the braze sintered preform.

5. The method of claim 1, wherein the braze sintered preform comprises a substantially homogeneous mixture of a high melt Ni- or Co-based superalloy powder and a low melt braze powder.

6. The method of claim 1, wherein the braze sintered preform comprises between 0.05 and 0.116 wt. % carbon, between 0.11 and 0.376 wt. % silicon, between 8.424 wt. % and 11.640 wt. % chromium, between 0.284 wt. % and 0.835 wt. % boron, between 4.8 wt. % and 5.8 wt. % aluminum, between 2.675 wt. % and 4.232 wt. % tungsten, between 0.650 wt. % and 1.362 wt. % molybdenum, between 1.4 wt. % and 2.462 wt. % rhenium, between 7.184 wt. % and 8.942 wt. % tantalum, between 0.690 wt. % and 1.386 wt. % hafnium, and between 8.725 wt. % and 10.964 wt. % cobalt, and nickel.

7. The method of claim 6, wherein the braze sintered preform comprises a maximum of 0.082 wt. % manganese, a maximum of 0.003 wt. % sulfur, a maximum of 0.013 wt. % phosphorus, a maximum of 0.018 wt. % titanium, a maximum of 0.161 wt. % yttrium, a maximum of 0.034 wt. % zirconium, a maximum of 0.180 wt. % iron, a maximum of 0.093 wt. % vanadium, a maximum of 0.10 wt. % copper, a maximum of 0.007 wt. % magnesium, a maximum of 0.084 wt. % oxygen, a maximum of 0.030 wt. % nitrogen, a maximum of 0.242 wt. % platinum, and a maximum of 0.150 wt. % other elements.

8. The method of claim 6, wherein the braze sintered preform comprises about 0.3 wt. % silicon, about 10.2 wt. % chromium, about 0.6 wt. % boron, about 5.2 wt. % aluminum, about 3.3 wt. % tungsten, about 0.9 wt. % molybdenum, about 1.8 wt. % rhenium, about 52.1 wt. % nickel, about 0.2 wt. % niobium, about 8.1 wt. % tantalum, about 1.0 wt. % hafnium, and about 9.6 wt. % Co.

9. The method of claim 6, wherein the braze sintered preform comprises about 0.2 wt. % silicon, about 8.6 wt. % chromium, about 0.3 wt. % boron, about 5.7 wt. % aluminum, about 4.1 wt. % tungsten, about 1.2 wt. % molybdenum, about 2.3 wt. % rhenium, about 52.2 wt. % nickel, about 0.1 wt. % niobium, about 7.3 wt. % tantalum, about 1.2 wt. % hafnium, and about 10.7 wt. % Co.

10. The method of claim 1, wherein heating at least the braze sintered preform comprises heating at least the braze sintered preform in a vacuum furnace at a temperature between about 1093 degrees Celsius and about 1260 degrees Celsius.

11. A method for repairing an article, the method comprising:
   removing a portion of a base component of the article, the base component being adjacent to a damaged portion of the base component to define a repair portion of the base component,
   wherein the base component comprises a cobalt- or nickel-based superalloy, and wherein the repair portion of the base component comprises a through-hole extending from a first surface of the base component to an inner surface of the base component;
   forming a braze sintered preform to substantially reproduce a shape of the through-hole, wherein the braze sintered preform comprises a Ni- or Co-based alloy;
   placing the braze sintered preform in the through-hole; and
   heating at least the braze sintered preform to cause the braze sintered preform to join to the repair portion of the base component and change a microstructure of the braze sintered preform to a brazed and diffused microstructure,
   wherein the braze sintered preform comprises three-dimensional surface features on a first side of the braze sintered preform, wherein the first side of the braze sintered preform in positioned adjacent the inner surface of the base component, and wherein the three-dimensional surface features substantially reproduce three-dimensional surface features of the damaged portion of the inner surface of the base component,
   wherein the article further comprises a second component defining a surface opposing the inner surface of the base component,
   wherein the article comprises a turbine vane, wherein the base component defines a first wall of the turbine vane, and the second component defines a second wall of the turbine vane, and
   wherein the three-dimensional surface features of the braze sintered preform comprise at least one of a pedestal or a cooling feature, wherein the at least one of the pedestals or the cooling feature substantially reproduce at least one of a pedestal or a cooling feature of the damaged portion of the inner surface of the first wall.

12. The method of claim 11, wherein placing the braze sintered preform in the through-hole comprising placing the braze sintered preform such that the first side is substantially parallel to the inner surface of the base component.

13. The method of claim 11, wherein the braze sintered preform substantially fills a depth of the through-hole.

14. The method of claim 11, further comprising spot welding the braze sintered preform in place relative to the base component prior to heating at least the braze sintered preform.

15. The method of claim 11, wherein the braze sintered preform comprises a substantially homogeneous mixture of a high melt Ni- or Co-based superalloy powder and a low melt braze powder.

16. The method of claim 11, wherein the braze sintered preform comprises between 0.05 and 0.116 wt. % carbon, between 0.11 and 0.376 wt. % silicon, between 8.424 wt. % and 11.640 wt. % chromium, between 0.284 wt. % and 0.835 wt. % boron, between 4.8 wt. % and 5.8 wt. % aluminum, between 2.675 wt. % and 4.232 wt. % tungsten, between 0.650 wt. % and 1.362 wt. % molybdenum, between 1.4 wt. % and 2.462 wt. % rhenium, between 7.184 wt. % and 8.942 wt. % tantalum, between 0.690 wt. % and 1.386 wt. % hafnium, and between 8.725 wt. % and 10.964 wt. % cobalt, and nickel.

17. The method of claim 16, wherein the braze sintered preform comprises a maximum of 0.082 wt. % manganese, a maximum of 0.003 wt. % sulfur, a maximum of 0.013 wt. % phosphorus, a maximum of 0.018 wt. % titanium, a maximum of 0.161 wt. % yttrium, a maximum of 0.034 wt. % zirconium, a maximum of 0.180 wt. % iron, a maximum of 0.093 wt. % vanadium, a maximum of 0.10 wt. % copper, a maximum of 0.007 wt. % magnesium, a maximum of 0.084 wt. % oxygen, a maximum of 0.030 wt. % nitrogen, a maximum of 0.242 wt. % platinum, and a maximum of 0.150 wt. % other elements.

18. The method of claim 16, wherein the braze sintered preform comprises about 0.3 wt. % silicon, about 10.2 wt. % chromium, about 0.6 wt. % boron, about 5.2 wt. % aluminum, about 3.3 wt. % tungsten, about 0.9 wt. % molybdenum, about 1.8 wt. % rhenium, about 52.1 wt. % nickel, about 0.2 wt. % niobium, about 8.1 wt. % tantalum, about 1.0 wt. % hafnium, and about 9.6 wt. % Co.

19. The method of claim 16, wherein the braze sintered preform comprises about 0.2 wt. % silicon, about 8.6 wt. % chromium, about 0.3 wt. % boron, about 5.7 wt. % aluminum, about 4.1 wt. % tungsten, about 1.2 wt. % molybdenum, about 2.3 wt. % rhenium, about 52.2 wt. % nickel, about 0.1 wt. % niobium, about 7.3 wt. % tantalum, about 1.2 wt. % hafnium, and about 10.7 wt. % Co.

20. The method of claim 11, wherein heating at least the braze sintered preform comprises heating at least the braze sintered preform in a vacuum furnace at a temperature between about 1093 degrees Celsius and about 1260 degrees Celsius.

* * * * *